(12) United States Patent
Chen et al.

(10) Patent No.: US 11,631,062 B2
(45) Date of Patent: Apr. 18, 2023

(54) VOUCHER VERIFICATION AUXILIARY DEVICE, VOUCHER VERIFICATION AUXILIARY SYSTEM, AND VOUCHER VERIFICATION AUXILIARY METHOD

(71) Applicant: INDUSTRIAL TECHNOLOGY RESEARCH INSTITUTE, Hsinchu (TW)

(72) Inventors: Yi-Yuan Chen, Hsinchu (TW); Kun-Hsien Lin, Hsinchu (TW); Yi-Chang Wang, Hsinchu (TW); Yao-Tai Tseng, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 224 days.

(21) Appl. No.: 16/243,149

(22) Filed: Jan. 9, 2019

(65) Prior Publication Data

US 2020/0090139 A1  Mar. 19, 2020

(30) Foreign Application Priority Data

Sep. 19, 2018 (TW) ................................ 107132924

(51) Int. Cl.
  *G06Q 20/04* (2012.01)
  *G06Q 20/38* (2012.01)
  (Continued)

(52) U.S. Cl.
  CPC ....... *G06Q 20/0457* (2013.01); *G06Q 20/204* (2013.01); *G06Q 20/3829* (2013.01); *G06K 7/1417* (2013.01); *G06Q 2220/00* (2013.01)

(58) Field of Classification Search
  CPC ............ G06Q 20/382; G06Q 20/3821; G06Q 20/38215; G06Q 20/3823; G06Q 20/3829;
  (Continued)

(56) References Cited

U.S. PATENT DOCUMENTS 8,540,149 B1 * 9/2013 Chu .................. G06Q 20/3274
                                                      235/380
9,501,773 B2  11/2016 Dai
  (Continued)

FOREIGN PATENT DOCUMENTS

CN        103116846 A  *  5/2013  ........... G06Q 20/327
CN        103295341        9/2013
  (Continued)

OTHER PUBLICATIONS

CN-106779679-A (IP.com translation) (Year: 2017).*
  (Continued)

*Primary Examiner* — James D Nigh
*Assistant Examiner* — Jeffrey L Licitra
(74) *Attorney, Agent, or Firm* — Amin, Turocy & Watson, LLP (57) ABSTRACT

A voucher verification auxiliary method is provided, including: when a user device is approaching a voucher verification auxiliary device, generating an encryption key for the user device to encrypt voucher data with the encryption key to generate first encrypted data; reading and decrypting the first encrypted data to obtain the voucher data; encrypting the voucher data to generate and transmit second encrypted data to a verification center; decrypting the second encrypted data to obtain the voucher data, generating a verification result after verifying the voucher data, encrypting the verification result to become third encrypted data, and transmitting the third encrypted data back to the voucher verification
  (Continued)

auxiliary device; decrypting the third encrypted data to obtain the verification result; transmitting the verification result to a voucher receiving terminal. A voucher verification auxiliary device and a voucher verification auxiliary system are also provided.

16 Claims, 6 Drawing Sheets

(51) Int. Cl.
*G06Q 20/20* (2012.01)
*G06K 7/14* (2006.01)

(58) Field of Classification Search
CPC .... G06Q 20/40; G06Q 20/401; G06Q 20/409; G06Q 20/4093; G06Q 20/4097; G06Q 20/40975; G06Q 20/3274; G06Q 20/0457; G07G 1/0045
See application file for complete search history.

(56) References Cited

U.S. PATENT DOCUMENTS

| | | | |
|---|---|---|---|
| 2007/0232269 A1* | 10/2007 | Jung | G06F 21/602 455/411 |
| 2009/0265555 A1 | 10/2009 | Royer | |
| 2011/0264587 A1 | 10/2011 | Bykov et al. | |
| 2015/0046336 A1* | 2/2015 | Cummins | G06Q 20/3829 705/65 |
| 2015/0066778 A1* | 3/2015 | Jang | G06Q 20/20 705/71 |
| 2015/0071647 A1* | 3/2015 | Suresh | H04B 10/116 398/130 |
| 2015/0088674 A1* | 3/2015 | Flurscheim | G06Q 20/3821 705/17 |
| 2016/0027017 A1* | 1/2016 | Chitragar | G06Q 20/202 705/71 |
| 2016/0099774 A1* | 4/2016 | Sim | H04W 88/06 398/115 |
| 2017/0286873 A1* | 10/2017 | Grimault | G06Q 20/3229 |
| 2018/0144310 A1 | 5/2018 | Li | |
| 2019/0244198 A1* | 8/2019 | Waters | G06Q 20/385 |
| 2019/0370772 A1* | 12/2019 | Youssef | G06Q 20/3823 |
| 2020/0065808 A1* | 2/2020 | Fernandez | G06Q 20/3224 |

FOREIGN PATENT DOCUMENTS

| | | | | |
|---|---|---|---|---|
| CN | 103426221 | | 12/2013 | |
| CN | 103475623 | | 12/2013 | |
| CN | 106779679 | | 5/2017 | |
| CN | 106779679 A | * | 5/2017 | |
| CN | 107545427 | | 1/2018 | |
| CN | 107798533 | | 3/2018 | |
| CN | 107798533 A | * | 3/2018 | |
| EP | 3298813 B1 | * | 4/2019 | ......... H04B 10/1141 |
| TW | 201033912 | | 9/2010 | |
| TW | I584210 | | 5/2017 | |
| TW | 201801018 | | 1/2018 | |
| TW | I611358 | | 1/2018 | |
| TW | I623894 | | 5/2018 | |
| WO | 2008/008037 | | 1/2008 | |

OTHER PUBLICATIONS

CN-103116846-A IP.com translation (Year: 2013).*
M. Novak, O. Wilfert and T. Simicek, "Visible light communication beacon system for internet of things," 2017 Conference on Microwave Techniques (COMITE), 2017, pp. 1-5, doi: 10.1109/COMITE.2017.7932304. (Year: 2017).*
CN-107798533-A IP.com translation (Year: 2018).*
CN110930146A Credential verification assistance apparatus, system and method thereof IP.com translation (translation of application from IDS) (Year: 2018).*
K. Okuda, M. Murata, T. Nakamura, W. Uemura and T. Yamamoto, "Proposal and development of encryption key distribution system using visible light communication," 2011 IEEE International Conference on Consumer Electronics—Berlin, 2011, pp. 71-73, doi: 10.1109/ICCE-Berlin.2 (Year: 2011).*
Zhang, et al. "SBVLC: Secure Barcode-Based Visible Light Communication for Smartphonese", IEEE Transactions an Mobile Computing, vol. 15, No. 2, Feb. 2016, pp. 432-446.
Galal, et al. "Smartphones for Payments and Withdrawals Utilizing Embedded LED Flashlight for High Speed Data Transmission", 2013 IEEE Fifth International Conference on Computational Intelligence, Communication Systems and Networks, pp. 63-66.
Conde-Lagoa, et al. "Secure eTickets Based on QR-Codes with User-Encrypted Content", 2010 IEEE.
Taiwanese Office Action for Taiwanese Patent Application No. 107132924 dated Sep. 9, 2019.
Chinese Office Action for Chinese Patent Application No. 201811188451.7 dated Jan. 9, 2023.
Xu, "Research and Implementation of Near Field Communication Protocol Based on Visible Light", Dissertation Submitted to Zhejiang University of Technology, May 2017.
Jun, "A study on security application of the 2D bar code technology in mobile terminal", Dissertation Submitted to Guangdong University of Technology, Jun. 2015.
Chinese Office Action for Chinese Patent Application No. 201811188451.7 dated May 26, 2022.

* cited by examiner

VOUCHER VERIFICATION AUXILIARY DEVICE, VOUCHER VERIFICATION AUXILIARY SYSTEM, AND VOUCHER VERIFICATION AUXILIARY METHOD

CROSS-REFERENCE TO RELATED APPLICATIONS

This application claims priority to Taiwanese Application Serial No. 107132924, filed on Sep. 19, 2018. The entirety of the above-mentioned patent application is hereby incorporated by reference herein and made a part of this specification.

1. TECHNICAL FIELD

The disclosure relates to verification mechanisms for electronic vouchers, and, relates to a voucher verification auxiliary device, a voucher verification auxiliary system, and a voucher verification auxiliary method.

2. BACKGROUND

With the rapid development of mobile payment, it becomes common for a mobile phone to check and verify tickets. As the techniques for verifying vouchers get improved, the equipment that verifies the vouchers has to have new functions to address the improved verification techniques. However, updating the equipment is costly. Since the voucher can be applied to a variety of fields, how to ensure the safety of the voucher is becoming one of the most promising respects of this technical field.

As many novel payment mechanisms are brought to the market, the current point-of-sale (POS) terminal is incompetent. A store is generally unwilling to pay high software amending fee to update its conventional POS terminal, or replace the old POS terminal with an m-POS or any other new model of POS. As a result, the store cannot complete any transaction based on newly developed payment mechanisms. With regard to the usage safety of the voucher, the current electronic ticket is verified and canceled via QR code technique. However, the QR code is easily to be photographed and embezzled by a camera. Therefore, it becomes important for a store to verify the voucher. Moreover, the current QR code reader is connected to the platform and POS terminal of the store, and is thus easily to be attacked and paralyzed when reading a great number of fake bar codes in a short period of time.

Given the above, how to solve the problem of verifying the voucher, without replacing the current equipment, in order to protect the voucher from being stolen or used improperly and promote the safety of verification of the voucher, is becoming one of the most important issues in the technical field.

SUMMARY

The disclosure provides a voucher verification auxiliary device, including: an encryption key generating unit configured for, when a user device is approaching thereto, generating an encryption key and transmitting the encryption key to the user device via a first transmission interface; a first decrypting unit configured for receiving first encrypted data from the user device via a second transmission interface and decrypting the first encrypted data with the encryption key to obtain voucher data stored in the user device, wherein the encryption key encrypts the voucher data to generate the first encrypted data; a second encrypting unit configured for encrypting the voucher data decrypted by the first decrypting unit to generate second encrypted data and transmitting the second encrypted data via a third transmission interface to a verification center for verification of the voucher data, the verification center encrypting a verification result generated as a result of the verification of the voucher data, wherein the verification result is obtained after the verification center decrypts the second encrypted data and a voucher verification process is performed; and a second decrypting unit configured for receiving and decrypting the third encrypted data from the verification center to obtain the verification result corresponding to the voucher data and transmitting the verification result to a voucher receiving terminal via a fourth transmission interface.

The disclosure further provides a voucher verification auxiliary system, including: a user device configured for storing voucher data to be verified; a voucher verification auxiliary device, comprising: an encryption key generating unit configured for, when the user device is approaching thereto, generating an encryption key and transmitting the encryption key to the user device, allowing the user device to encrypt the voucher data with the encryption key and generate first encrypted data; a first decrypting unit configured for receiving the first encrypted data from the user device and decrypting the first encrypted data with the encryption key generated by the encryption key generating unit to obtain the voucher data; a second encrypting unit configured for encrypting the voucher data decrypted by the first decrypting unit to generate second encrypted data for verification of the voucher data; and a second decrypting unit configured for receiving and decrypting third encrypted data to obtain a verification result generated as a result of the verification of the voucher data; a verification center configured for receiving and decrypting the second encrypted data from the voucher verification auxiliary device to obtain the voucher data, encrypting the verification result to generate the third encrypted data after the voucher data is verified to be correct and the verification result is generated, and transmitting the third encrypted data back to the second decrypting unit for decryption; and a voucher receiving terminal configured for receiving the verification result from the second decrypting unit.

The disclosure also provides a voucher verification auxiliary method, including: when a user device stored with voucher data is approaching a voucher verification auxiliary device, enabling the voucher verification auxiliary device to generate and transmit an encryption key to the user device for the user device to encrypt the voucher data with the encryption key to generate first encrypted data; enabling the voucher verification auxiliary device to read the first encrypted data and decrypt the first encrypted data with the encryption key to obtain the voucher data; enabling the voucher verification auxiliary device to encrypt the voucher data to generate and transmit second encrypted data to a verification center for verification of the voucher data; enabling the verification center to decrypt the second encrypted data from the voucher verification auxiliary device to obtain the voucher data, to generate a verification result after the voucher data is verified as a legal voucher, to encrypt the verification result to generate third encrypted data, and to transmit the third encrypted data back to the voucher verification auxiliary device; enabling the voucher verification auxiliary device to decrypt the third encrypted data from the verification center to obtain the verification result corresponding to the voucher data; and enabling the voucher verification auxiliary device to transmit the verification result to a voucher receiving terminal.

BRIEF DESCRIPTION OF DRAWINGS

The disclosure can be more fully understood by reading the following detailed description of the embodiments, with reference made to the accompanying drawings, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
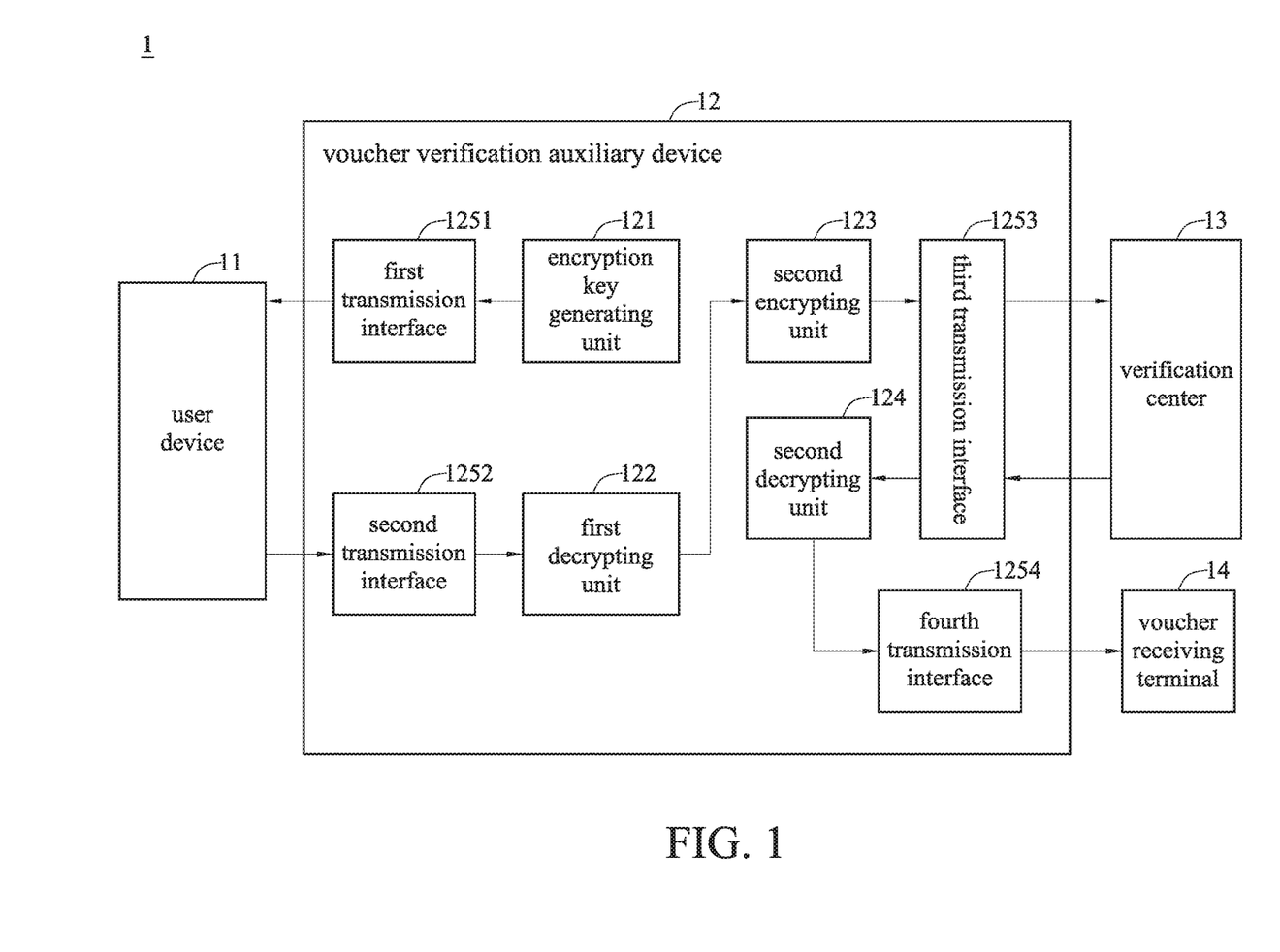
FIG. 1 is a functional block diagram of a voucher verification auxiliary device and a voucher verification auxiliary system of an embodiment according to the present disclosure.

FIG. 1 is a functional block diagram of a voucher verification auxiliary device and a voucher verification auxiliary system of an embodiment according to the disclosure. The voucher verification auxiliary system 1 can provide an auxiliary verification function under the current architecture when a user verifies a voucher by using his electronic device. The voucher verification auxiliary system 1 includes a user device 11, a voucher verification auxiliary device 12, a verification center 13 and a voucher receiving terminal 14.

The user device 11 is stored with voucher data to be verified. In an embodiment, the user device 11 is stored with an electronic voucher, which, after being verified, can provide a corresponding service. As the user is going to exchange his electronic voucher, the store owner has to verify the electronic voucher to make sure that the electronic voucher is legal.

The voucher verification auxiliary device 12 is used to auxiliary verify the electronic voucher, and can be installed in equipment, e.g., voucher reading equipment, that a store uses to read the electronic voucher and be connected to a network. The voucher verification auxiliary device 12 comprises an encryption key generating unit 121, a first decrypting unit 122, a second encrypting unit 123 and a second decrypting unit 124.

The encryption key generating unit 121 generates an encryption key as the user device 11 is approaching or close to the voucher verification auxiliary device 12. The encryption key will be transmitted to the user device 11, for the user device 11 to encrypt the voucher data with the encryption key to generate first encrypted data. The first encrypted data will be transmitted to and verified by the voucher verification auxiliary device 12.

The first decrypting unit 122 receives the first encrypted data from the user device 11, and decrypts the first encrypted data with the encryption key from the encryption key generating unit 121 to obtain the voucher data. After obtaining the voucher data, the voucher verification auxiliary device 12 sends the voucher data to the verification center 13 for verification.

The second encrypting unit 123 encrypts the voucher data that has been decrypted by the first decrypting unit 122 to generate second encrypted data, for subsequent verification of the voucher data. In order to protect the voucher data from being stolen when the voucher data is sent to the verification center 13, the voucher verification auxiliary device 12 will encrypt and then send the voucher data. The encrypted voucher data is the second encrypted data.

The second decrypting unit 124 receives and decrypts the third encrypted data to obtain a verification result associated with the voucher data. The third encrypted data comes from the verification center 13, and the verification center 13 encrypts the verification result to become the third encrypted data. After the third encrypted data is sent back to the voucher verification auxiliary device 12, the second decrypting unit 124 receives and decrypts the third encrypted data, thereby obtaining the verification result of the voucher data.

During a verification process, the verification center 13 receives and decrypts the second encrypted data from the voucher verification auxiliary device 12 to obtain the voucher data, generates the verification result after verifying that the voucher data is correct, and encrypts the verification result to generate the third encrypted data. The third encrypted data will be transmitted back to the second decrypting unit 124 for decryption.

The voucher receiving terminal 14 receives the verification result from the second decrypting unit 124 of the voucher verification auxiliary device 12. After the second decrypting unit 124 decrypts the third encrypted data, the verification result of the voucher data, i.e., the corresponding content of the voucher data, can be obtained. Therefore, the user can use the electronic voucher on his user device 11. In an embodiment, the voucher receiving terminal 14 is a point-of-sale (POS) terminal, e.g., a point-of-sale terminal already installed in the store.

The voucher verification auxiliary device 12 allows the store owner to verify an electronic voucher, without replacing the existing POS terminal, and ensures the integrity and safety of the data by encrypting the data.

The data can be transmitted by a variety of techniques. The voucher verification auxiliary device 12 comprises a first transmission interface 1251, a second transmission interface 1252, a third transmission interface 1253 and a fourth transmission interface 1254. The voucher verification auxiliary device 12 transmits the encryption key to the user device 11 via the first transmission interface 1251. In an embodiment, the first transmission interface 1251 employs Visible Light Communication (VLC) technique and transmits the encryption key by an optical communication technique.

The voucher verification auxiliary device 12 receives via the second transmission interface 1252 the first encrypted data sent back from the user device 11. In an embodiment, the second transmission interface 1252 employs QR code technique. The user device 11 thus encrypts the voucher data with the encryption key to generate the first encrypted data that is a QR code. Accordingly, the second transmission interface 1252 is a QR code reader.

The voucher data, after being encrypted by the second encrypting unit 123, can be transmitted via the third transmission interface 1253 to the verification center 13. Since the verification center 13 is a server installed externally or in a cloud, the third transmission interface 1253 may employ WiFi technique to transmit and receive data.

After decrypting the third encrypted data from the verification center 13, the second decrypting unit 124 will obtain the verification result of the voucher data. The verification result can be transmitted via the fourth transmission interface 1254 to the voucher receiving terminal 14. As the voucher verification auxiliary device 12 is installed close to the voucher receiving terminal 14, they can be connected to each other by a Universal Serial Bus (USB) and data can be transmitted therebetween. Accordingly, the fourth transmission interface 1254 may be a USB interface.

Figure 2:
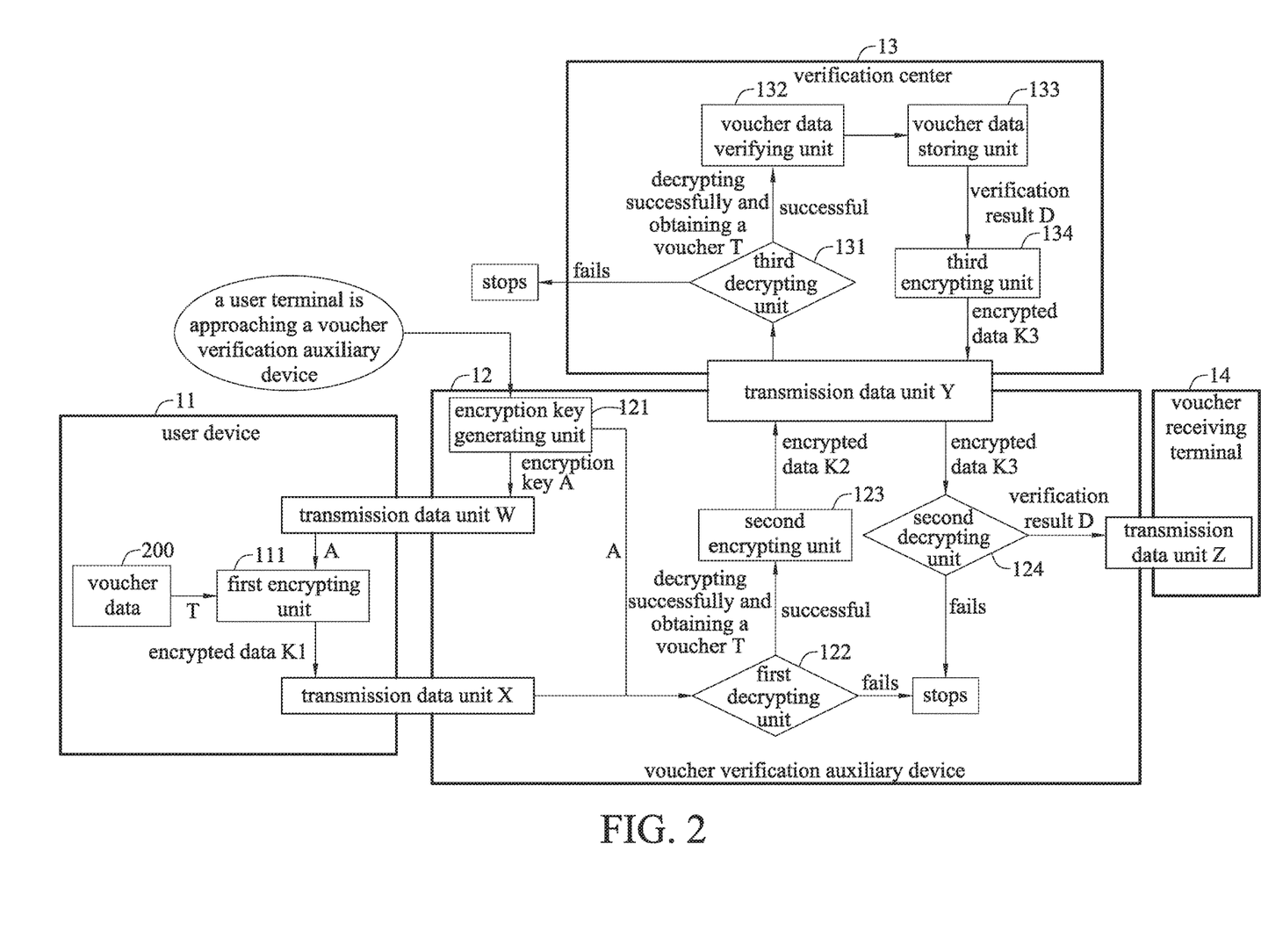
FIG. 2 is a flow chart illustrating the operation of a voucher verification auxiliary system of an embodiment according to the present disclosure.

FIG. 2 illustrates how a voucher verification auxiliary system of an embodiment according to the disclosure operates. The user device 11, the voucher verification auxiliary device 12, the verification center 13, the voucher receiving terminal 14, and the encryption key generating unit 121, the first decrypting unit 122, the second encrypting unit 123 and the second decrypting unit 124 of the voucher verification auxiliary device 12 shown in FIG. 2 are the same as those shown in FIG. 1, further description thereof hereby omitted. The embodiment is described with respect to the system operation and the inner details of the verification center 13. The information transmission manners among the user device 11, the voucher verification auxiliary device 12, the verification center 13 and the voucher receiving terminal 14 are represented by data transmitting units W, X, Y and Z, without further describing a variety of transmission interfaces in the equipment. The components that relate to the disclosure are disclosed.

As the user device 11 is approaching the voucher verification auxiliary device 12, the encryption key generating unit 121 of the voucher verification auxiliary device 12 generates the encryption key A, which will be transmitted via the data transmitting unit W to the user device 11. In an embodiment, the data transmitting unit W employs Visible Light Communication (VLC) technique, and the voucher verification auxiliary device 12 issues and the user device 11 receives visible light having the encryption key A.

After the user device 11 receives the encryption key A, the first encrypting unit 111 encrypts voucher data 200 (i.e., a voucher T) stored therein with the encryption key A to generate the first encrypted data K1. The first encrypted data K1 is transmitted via the data transmitting unit X back to the voucher verification auxiliary device 12 and processed by the first decrypting unit 122. In an embodiment, the data transmitting unit X employs QR code technique, and the user device 11 displays a QR code, allowing the voucher verification auxiliary device 12 to read the QR code with a QR code reader.

When the encryption key generating unit 121 generates the encryption key A, the first decrypting unit 122 will also obtain the encryption key A. After receiving the first encrypted data K1, the first decrypting unit 122 will decrypt the first encrypted data K1 with the encryption key A. If the encryption is successful, the voucher T will be obtained. The voucher T will be transmitted to the second encrypting unit 123, in order for it to be transmitted to the verification center 13 subsequently. If the decryption fails, which means that the data transmitted is false or is stolen or falsified, the verification stops.

Since the voucher T has to be transmitted to the verification center 13 for verification, the second encrypting unit 123 encrypts the voucher T to generate the second encrypted data K2. In an embodiment, the second encrypting unit 123 employs an encryption algorithm of AES256, and the second encrypted data K2 is transmitted via the data transmitting unit Y to the verification center 13. In another embodiment, the verification center 13 is a cloud server, and the transmission mechanism of the data transmitting unit Y is WiFi technique.

The verification center 13 includes a third decrypting unit 131, a voucher data verifying unit 132, a voucher data storing unit 133 and a third encrypting unit 134. The third decrypting unit 131 receives and decrypts the second encrypted data K2. If the decryption is successful, the voucher T will be obtained; otherwise, the verification center 13 stops the verification.

The voucher data verifying unit 132 verifies voucher data. After the third decrypting unit 131 decrypts the voucher T successfully, the voucher data verifying unit 132 verifies the voucher T. The voucher data storing unit 133 will be stored with corresponding contents of a plurality of voucher data, and find out the corresponding content corresponding to the voucher T after the voucher T is verified successfully. The corresponding content is a verification result D. In an embodiment, the corresponding content is a corresponding discount or preferential price message.

After the voucher data storing unit 133 finds out the corresponding content of the voucher T (i.e., the verification result D), the verification result D will be transmitted to the third encrypting unit 134 for encryption, thereby generating the third encrypted data K3. The encryption operation is to protect the data from being stolen. The third encrypted data K3 is also transmitted via the data transmitting unit Y back to the voucher verification auxiliary device 12.

After receiving the third encrypted data K3, the second decrypting unit 124 of the voucher verification auxiliary device 12 decrypts the third encrypted data K3. If the decryption is successful, the verification result D can be obtained; otherwise, the data received is false and cannot be read, and the verification stops. Finally, the verification result D is transmitted via the data transmitting unit Z to the voucher receiving terminal 14, and is being on voucher receiving terminal 14.

In summary, the voucher verification auxiliary device 12 can act as a bridge between a user device and a POS terminal (the voucher receiving terminal 14) in modern technology, and verify the voucher. No matter how the verification mechanism is changed thereafter, the electronic voucher can still be verified and processed without replacing the POS terminal.

Figure 3:
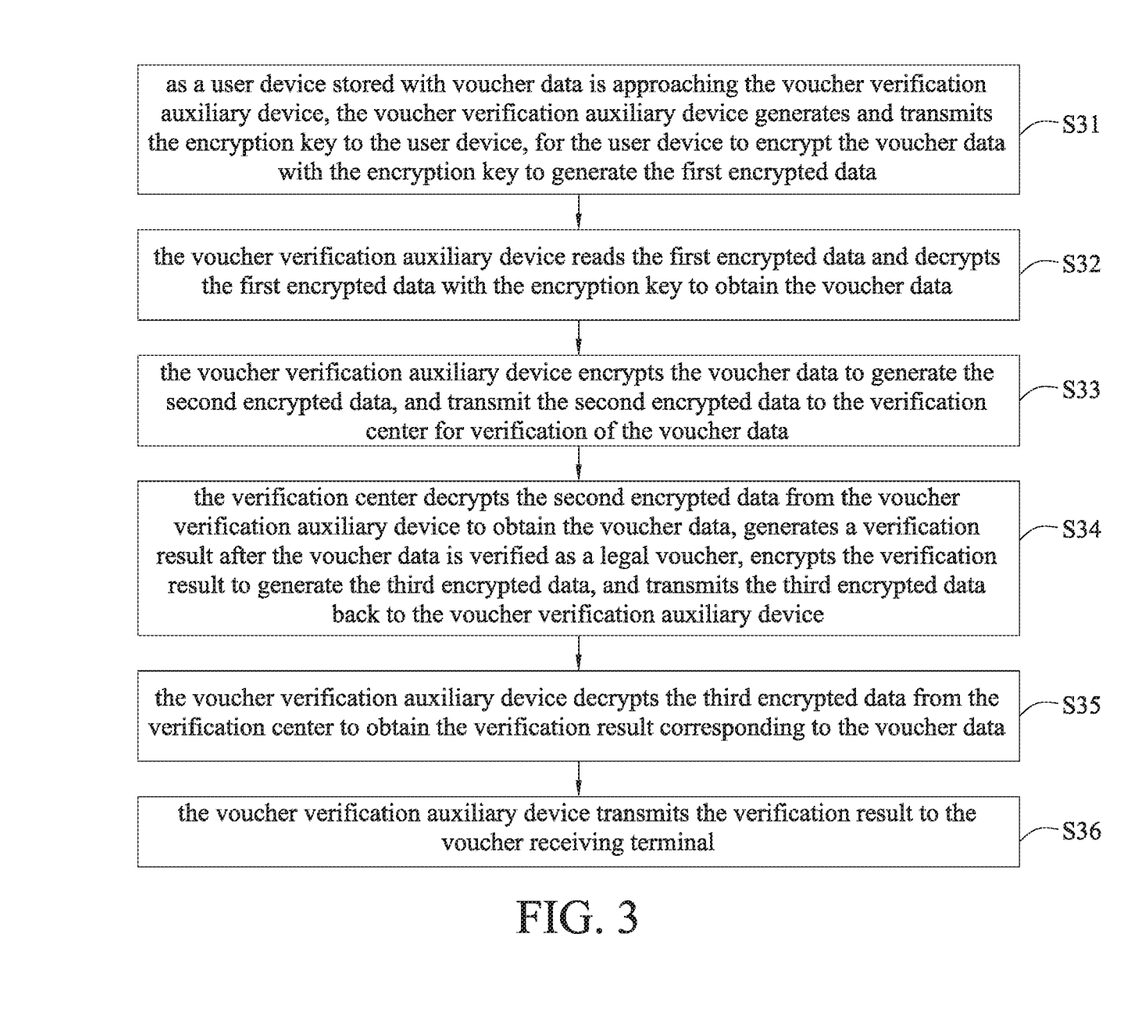
FIG. 3 is a flow chart of a voucher verification auxiliary method of an embodiment according to the present disclosure.

FIG. 3 is a flow chart of a voucher verification auxiliary method of an embodiment according to the disclosure. In step S31, as a user device stored with voucher data is approaching the voucher verification auxiliary device, the voucher verification auxiliary device generates and transmits the encryption key to the user device, for the user device to encrypt the voucher data with the encryption key to generate the first encrypted data. Step S31 describes that after the user device is close to the voucher verification auxiliary device, the user device will obtain the encryption key to encrypt the voucher data to become the first encrypted data, and the first encrypted data will be transmitted back to the voucher verification auxiliary device.

In an embodiment, the encryption key is transmitted between the user device and the voucher verification auxiliary device via Visible Light Communication (VLC) technique. In another embodiment, the first encrypted data is a QR code, and the voucher verification auxiliary device can use a QR code reader therein to read the QR code.

In step S32, the voucher verification auxiliary device reads the first encrypted data and decrypts the first encrypted data with the encryption key to obtain the voucher data. After reading the first encrypted data from the user device, the voucher verification auxiliary device will decrypt the first encrypted data to obtain the voucher data for subsequent verification.

In step S33, the voucher verification auxiliary device encrypts the voucher data to generate the second encrypted data, and transmit the second encrypted data to the verification center for verification of the voucher data. In order to protect the voucher data from being stolen when the voucher data is transmitted to the verification center, step S33 encrypts the voucher data again to generate the second encrypted data and transmits the second encrypted data to the verification center for verification.

In step S34, the verification center decrypts the second encrypted data from the voucher verification auxiliary device to obtain the voucher data, generates a verification result after the voucher data is verified as a legal voucher, encrypts the verification result to generate the third encrypted data, and transmits the third encrypted data back to the voucher verification auxiliary device. Step S34 describes how the verification center verifies the voucher data, including decrypting the second encrypted data to obtain the voucher data, finding out a corresponding content of the voucher data as the verification result, and encrypting and transmitting the verification result back to the voucher verification auxiliary device. In an embodiment, the voucher verification auxiliary device communicates with the verification center via a wireless communication network.

In step S35, the voucher verification auxiliary device decrypts the third encrypted data from the verification center to obtain the verification result corresponding to the voucher data. Step S35 describes that the voucher verification auxiliary device decrypts the third encrypted data to obtain the verification result. i.e., the corresponding content of the voucher data. In an embodiment, the corresponding content is a discount or preferential price message.

In step S36, the voucher verification auxiliary device transmits the verification result to the voucher receiving terminal. In step S36, the voucher receiving terminal receives the verification result transmitted from the voucher verification auxiliary device. In an embodiment, the verification result will be displayed on the voucher receiving terminal.

In an embodiment, the electronic voucher is applied to a store, and the voucher receiving terminal can display the contents that the electronic voucher having the voucher data can provide, such as a meal ticket or a coupon.

In another embodiment, the above verification procedures can be applied to electronic access control equipment. For instance, the voucher data is an electronic certificate representing user identity, the voucher data is still on the user's mobile phone (user device), and the voucher receiving terminal is equipment that controls door locks. The door locks can be unlocked as the user is verified by the above verification procedures as a legal user.

Figure 4:
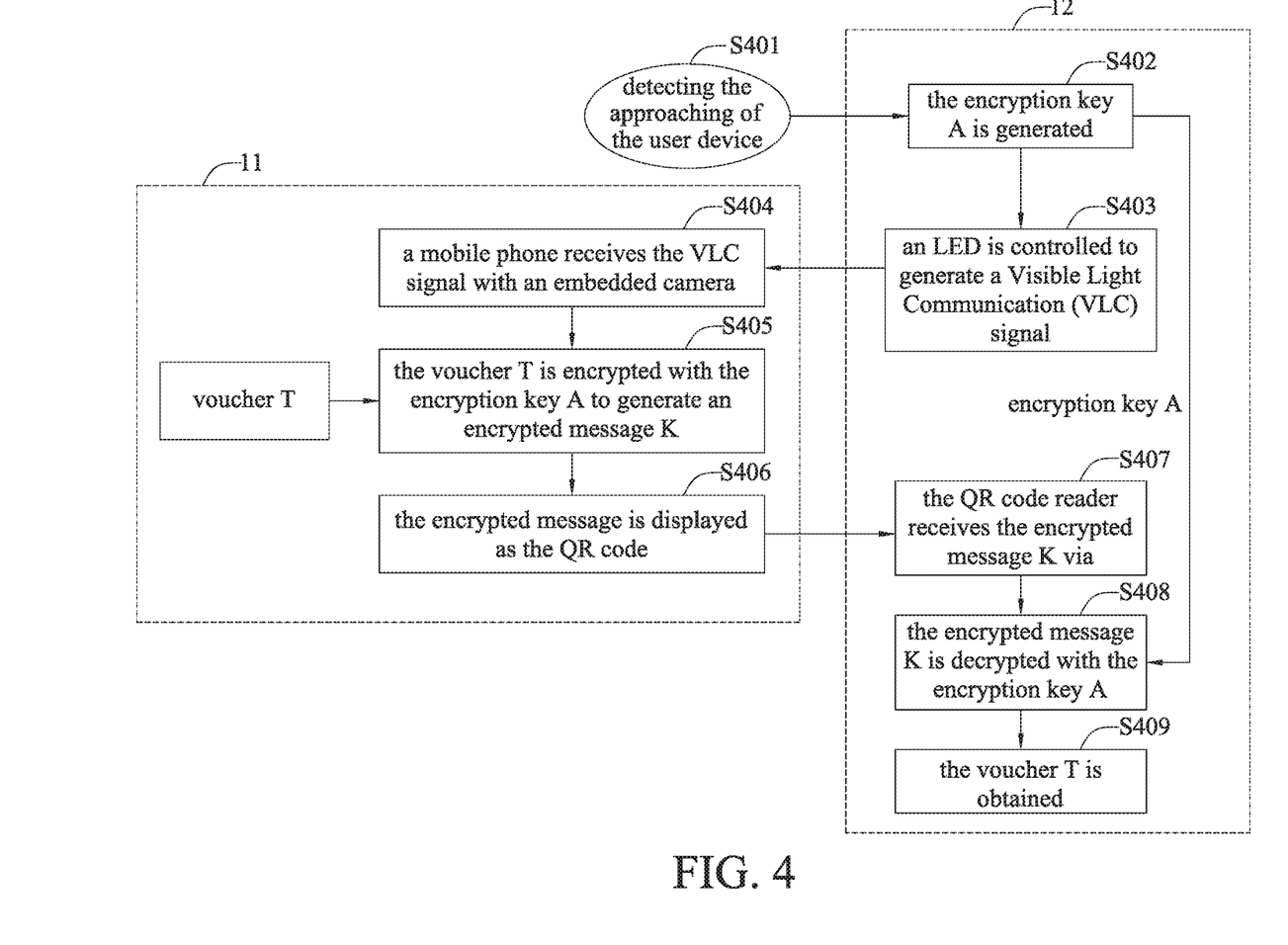
FIG. 4 is a flow chart illustrating how a user end cooperates with a voucher verification auxiliary device of an embodiment according to the present disclosure.

FIG. 4 is a flow chart illustrating how a user device of a user end cooperates with a voucher verification auxiliary device of an embodiment according to the present disclosure. FIG. 4 describes how the information can be transmitted between the user device of the user end and the voucher verification auxiliary device. In an embodiment, the user device 11 communicates with the voucher verification auxiliary device 12 via Visible Light Communication (VLC) technique.

In steps S401-S403, when detecting that the user device 11 is approaching thereto, the voucher verification auxiliary device 12 generates the encryption key A, and controls an LED to generate a Visible Light Communication (VLC) signal. The LED can encode the information of the encryption key A into an optical signal, and emits the optical signal.

In step S404, the user device 11 (i.e., a mobile phone) receives the VLC signal with an embedded camera (e.g., a front lens). In step S405, the voucher T is encrypted with the encryption key A to generate an encrypted message K. In step S406, the encrypted message is displayed as the QR code.

In step S407, the voucher verification auxiliary device 12 receives the encrypted message K via the QR code reader. In step S408, the encrypted message K is decrypted with the encryption key A generated in step S402. In step S409, the voucher T is obtained.

In the disclosure, the user device of the user end can communicate with the voucher verification auxiliary device via Visible Light Communication (VLC) technique. The optical communication technique is directional and is hard to be copied, so malicious people have no way to attack and paralyze the system, and the voucher verification auxiliary device (POS terminal) can be protected from the attacks of a great number of counterfeit bar codes and platforms of unidentified origins. Through the verification of the optical communication, malicious people cannot paralyze the bandwidth of the platform by using a great number of counterfeit bar codes. The cooperation of the optical communication technique and the physical LED prevents the platforms of unidentified origins from keeping transmitting forged information to the voucher verification auxiliary device (POS terminal), and ensures that the store can run normally.

Figure 5A:
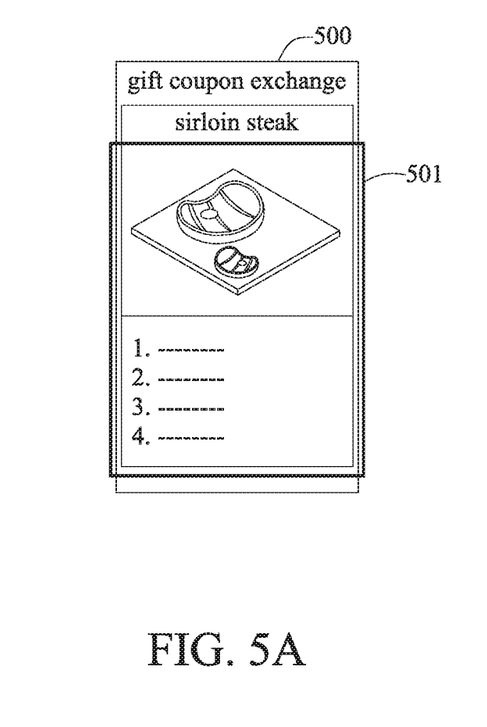
FIGS. 5A-5C illustrate how a user device and a voucher verification auxiliary device are used and how the user device displays a QR code of an embodiment according to the present disclosure.
Figure 5B:
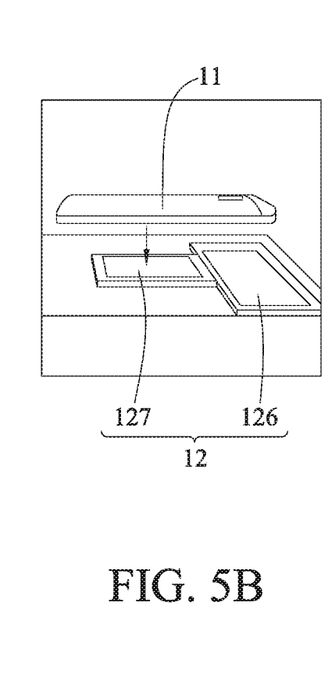
Figure 5C:
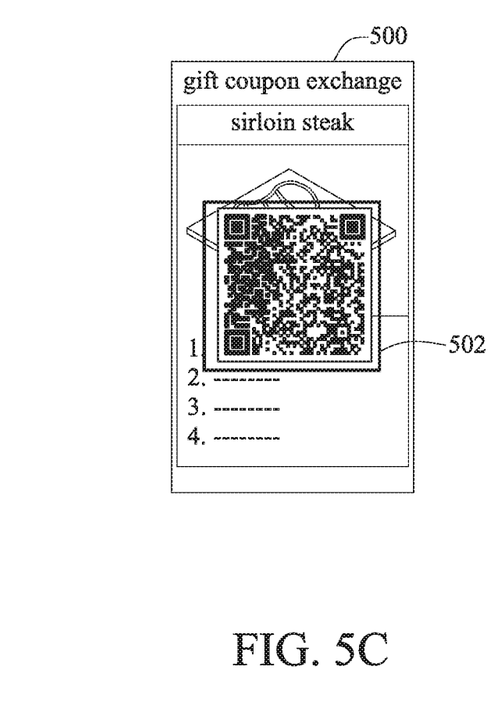

FIGS. 5A-5C illustrate how a user device and a voucher verification auxiliary device are used and how the user device displays a QR code of an embodiment according to the disclosure. FIGS. 5A-5C will be described in accompany with the flow chart of FIG. 4. FIG. 5A shows the content that the user device displays. A picture 500 indicates that the user displays an electronic voucher 501 on his user device. The electronic voucher 501 will be verified to determine whether it is usable.

As shown in FIG. 5B, the user device 11 is approaching the voucher verification auxiliary device 12. Then, an LED 126 of the voucher verification auxiliary device 12 emits a VLC signal, which will be captured by a front lens of a camera of the user device 11. The user device 11 encrypts the electronic voucher 501 to form a QR code, and a QR code reader 127 of the voucher verification auxiliary device 12 reads the QR code displayed on the user device 11. FIG. 5C shows the QR code. The picture 500 shows the content that the electronic voucher 501 is encrypted and encoded as a QR code 502. The QR code reader 127 reads the QR code 502.

Figure 6:
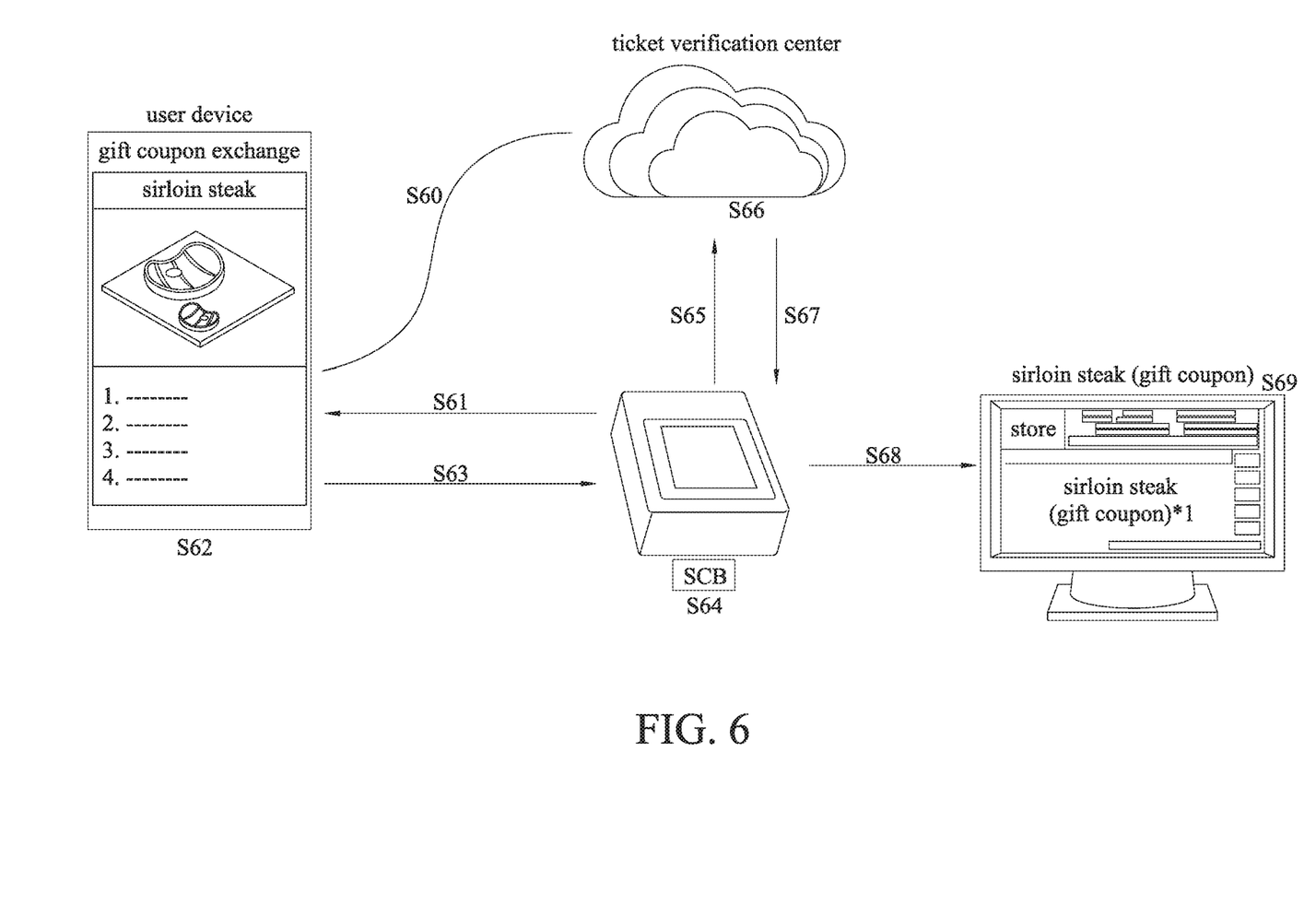
FIG. 6 is a schematic diagram of a voucher verification auxiliary system of an embodiment according to the present disclosure.

FIG. 6 is a schematic diagram of a voucher verification auxiliary system of an embodiment according to the disclosure. The voucher receiving terminal is exemplified as a POS terminal to describe the verification steps. In FIG. 6, the user device is shown in the left portion, the ticket verification center is shown in the top, middle portion, the voucher verification auxiliary device (e.g., smart consumer box (SCB)) is shown in the bottom, middle portion, and the voucher receiving terminal (i.e., the POS terminal) is shown in the right portion.

In the beginning, the POS may add a new gift coupon product, including setting a new item and its product code. For example, the new item is "sirloin steak (gift coupon)," and the product code is AB123456. Accordingly, the ticket verification center may add new gift coupon information, including the product code AB123456 set by the POS terminal of the store.

In step S60, the user device acquires a ticket voucher that has a number of 820307401553, for example. The ticket voucher is an electronic voucher that the user device acquires from the ticket verification center. The user can actuate the electronic voucher when he wants to use it.

In step S61, as the user actuates the electronic voucher with his user device and is approaching the voucher verification auxiliary device (the SCB), the user device will acquire an encryption key from the voucher verification auxiliary device.

In step S62, the user device, after acquiring the encryption key, encrypts the electronic voucher with the encryption key to obtain the first encrypted data K1. In an embodiment, the user device can acquire the encryption key via Visible Light Communication technique.

In step S63, the voucher verification auxiliary device acquires the first encrypted data K1 from the user device. In an embodiment, the first encrypted data K1 is a QR code, and the voucher verification auxiliary device is installed with a QR code reader.

In step S64, the voucher verification auxiliary device restores the electronic voucher with the encryption key, and acquires the ticket voucher having the number of 820307401553; and then encrypts the ticket voucher with a public key to generate the second encrypted data K2.

In step S65, the voucher verification auxiliary device transmits the second encrypted data K2 to the ticket verification center for verification. In an embodiment, the ticket verification center is a cloud or remote server, and the voucher verification auxiliary device can transmit the second encrypted data K2 to the ticket verification center via a general network.

In step S66, the ticket verification center verifies if the electronic voucher is valid to ensure that the electronic voucher is correct and is not used yet. Then, the product code AB123456 corresponding to the voucher is obtained by using the ticket voucher having the number of 820307401553, and the product code AB123456 of the electronic voucher is encrypted by the public key to become the third encrypted data K3.

In step S67, the ticket verification center transmits the third encrypted data K3 back to the voucher verification auxiliary device.

In step S68, the voucher verification auxiliary device restores the product code AB123456. In an embodiment, the voucher verification auxiliary device is installed with a small screen to display the product code, allowing the personnel in the store to read it easily. Finally, the product code AB123456 can be transmitted to a POS terminal via a USB.

In step S69, the POS terminal acquires the product code AB123456 transmitted from the voucher verification auxiliary device, and "sirloin steak (ticket)" can be displayed on a product list picture.

In conclusion, a voucher verification auxiliary device, a voucher verification auxiliary system and a voucher verification auxiliary method according to the disclosure install an voucher verification auxiliary device in a voucher receiving terminal, and use the voucher verification auxiliary device to verify the voucher, wherein the data transmitted among the user device, the verification center and the voucher verification auxiliary device are encrypted and protected by an encryption key to ensure the transmission safety. The verification center will verify if the voucher data is a legal voucher, to prevent the voucher from being photographed or screenshot and used illegally. Therefore, the voucher verification auxiliary device can communicate with the verification center directly, to achieve the objective of verifying the voucher without replacing the current equipment (e.g., the POS terminal or identity verification equipment). The disclosure can be applied no matter how the verification of the electronic voucher changes and develops.

It will be apparent to those skilled in the art that various modifications and variations can be made to the disclosed embodiments. It is intended that the specification and examples be considered as exemplary, with a true scope of the disclosure being indicated by the following claims and their equivalents.

What is claimed is:

1. A voucher verification auxiliary device, comprising:
   a memory storing a set of instructions; and
   a processor configured to execute the set of instructions to cause the voucher verification auxiliary device to perform:
     generating an encryption key when a user device is approaching the voucher verification auxiliary device having a light emitting diode (LED) and a visible light communication (VLC) signal, wherein the voucher verification auxiliary device controls the LED to generate the VLC signal with the encryption key, and a camera of the user device receives the VLC signal with the encryption key from the LED of the voucher verification auxiliary device;
     receiving first encrypted data from the user device and decrypting the first encrypted data with the encryption key of the VLC signal of the LED of the voucher verification auxiliary device to obtain voucher data stored in the user device, wherein the encryption key of the VLC signal of the LED of the voucher verification auxiliary device encrypts the voucher data of the user device to generate the first encrypted data of the user device;
     encrypting the voucher data of the user device decrypted by the verification auxiliary device having the LED and the VLC signal with the encryption key to generate second encrypted data and transmitting the second encrypted data to a verification center for verification of the voucher data of the user device, the verification center encrypting a verification result generated as a result of the verification of the voucher data of the user device to generate third encrypted data and transmitting the third encrypted data to the voucher verification auxiliary device having the LED and the VLC signal with the encryption key, wherein the verification result of the voucher data of the user device is obtained after the verification center decrypts the second encrypted data from the voucher verification auxiliary device having the LED and the VLC signal with the encryption key and a voucher verification process is performed; and
     receiving and decrypting the third encrypted data from the verification center to obtain the verification result corresponding to the voucher data of the user device and transmitting the verification result of the voucher data of the user device to a voucher receiving terminal.

2. The voucher verification auxiliary device of claim 1, wherein the voucher verification auxiliary device further performs transmitting the encryption key to the user device via a first transmission interface, wherein the first transmission interface employs VLC technique.

3. The voucher verification auxiliary device of claim 1, wherein the voucher verification auxiliary device further performs receiving the first encrypted data from the user device via a second transmission interface, wherein the first encrypted data is a QR code, and the second transmission interface is a QR code reader.

4. The voucher verification auxiliary device of claim 1, wherein the voucher verification auxiliary device further performs transmitting the second encrypted data via a third transmission interface to the verification center, wherein the third transmission interface employs WiFi technique.

5. The voucher verification auxiliary device of claim 1, wherein the voucher verification auxiliary device further performs transmitting the verification result to the voucher receiving terminal via a fourth transmission interface, wherein the fourth transmission interface is a USB interface.

6. The voucher verification auxiliary device of claim 1, wherein the voucher receiving terminal is a point-of-sale (POS) terminal or electronic access control equipment.

7. A voucher verification auxiliary system, comprising:
a user device configured for storing voucher data to be verified;
a voucher verification auxiliary device, comprising:
a memory storing a set of instructions; and
a processor configured to execute the set of instructions to cause the voucher verification auxiliary device to perform:
generating an encryption key when the user device is approaching the voucher verification auxiliary device having a light emitting diode (LED) and a visible light communication (VLC) signal, allowing the user device to encrypt the voucher data with the encryption key and generate first encrypted data, wherein the voucher verification auxiliary device controls the LED to generate the VLC signal with the encryption key, and a camera of the user device receives the VLC signal with the encryption key from the LED of the voucher verification auxiliary device;
receiving the first encrypted data from the user device and decrypting the first encrypted data with the encryption key of the VLC signal of the LED of the voucher verification auxiliary device to obtain the voucher data of the user device;
encrypting the voucher data of the user device decrypted by the voucher verification auxiliary device having the LED and the VLC signal with the encryption key to generate second encrypted data and transmitting the second encrypted data to a verification center for verification of the voucher data of the user device; and
receiving and decrypting third encrypted data from the verification center to obtain a verification result generated as a result of the verification of the voucher data of the user device;
the verification center configured for receiving and decrypting the second encrypted data from the voucher verification auxiliary device having the LED and the VLC signal with the encryption key to obtain the voucher data of the user device, encrypting the verification result to generate the third encrypted data decrypted by the voucher verification auxiliary device having the LED and the VLC signal with the encryption key after the voucher data of the user device is verified to be correct and the verification result is generated, and transmitting the third encrypted data back to the voucher verification auxiliary device having the LED and the VLC signal with the encryption key for decryption; and
a voucher receiving terminal configured for receiving the verification result of the voucher data of the user device verified by the verification center from the voucher verification auxiliary device having the LED and the VLC signal with the encryption key.

8. The voucher verification auxiliary system of claim 7, wherein the user device further encrypts the voucher data with the encryption key to obtain the first encrypted data.

9. The voucher verification auxiliary system of claim 7, wherein the verification center further performs:
receiving and decrypting the second encrypted data to obtain the voucher data;
verifying the voucher data;
storing corresponding contents of a plurality of voucher data and capturing the corresponding contents as the verification result after the voucher data is verified successfully; and
encrypting the verification result to generate the third encrypted data.

10. The voucher verification auxiliary system of claim 7, wherein the encryption key is transmitted between the user device and the voucher verification auxiliary device by VLC technique.

11. The voucher verification auxiliary system of claim 7, wherein the first encrypted data is a QR code, and the voucher verification auxiliary device reads the QR code by using a QR code reader therein.

12. The voucher verification auxiliary system of claim 7, wherein the voucher receiving terminal is a point-of-sale (POS) terminal or electronic access control equipment.

13. A voucher verification auxiliary method, comprising:
when a user device stored with voucher data is approaching a voucher verification auxiliary device having a light emitting diode (LED) and a visible light communication (VLC) signal, generating, by an encryption key generating unit of the voucher verification auxiliary device, an encryption key for the user device to encrypt the voucher data with the encryption key to generate first encrypted data, wherein the voucher verification auxiliary device controls the LED to generate the VLC signal with the encryption key, and a camera of the user device receives the VLC signal with the encryption key from the LED of the voucher verification auxiliary device;
reading, by a first decrypting unit of the voucher verification auxiliary device, the first encrypted data and decrypt the first encrypted data with the encryption key of the VLC signal of the LED of the voucher verification auxiliary device to obtain the voucher data of the user device;
encrypting, by a second encrypting unit of the voucher verification auxiliary device having the LED and the VLC signal with the encryption key, the voucher data of the user device to generate and transmit second encrypted data to a verification center for verification of the voucher data of the user device;
decrypting, by the verification center, the second encrypted data from the second encrypting unit of the voucher verification auxiliary device having the LED and the VLC signal with the encryption key to obtain the voucher data of the user device, to generate a verification result after the voucher data of the user device is verified as a legal voucher, to encrypt the verification result to generate third encrypted data, and to transmit the third encrypted data back to a second decrypting unit of the voucher verification auxiliary device having the LED and the VLC signal with the encryption key;

decrypting, by the second decrypting unit of the voucher verification auxiliary device having the LED and the VLC signal with the encryption key, the third encrypted data from the verification center to obtain the verification result corresponding to the voucher data of the user device; and transmitting, by the second decrypting unit of the voucher verification auxiliary device having the LED and the VLC signal with the encryption key, the verification result of the voucher data of the user device verified by the verification center to a voucher receiving terminal.

14. The voucher verification auxiliary method of claim 13, wherein the encryption key is transmitted between the user device and the voucher verification auxiliary device by VLC technique.

15. The voucher verification auxiliary method of claim 13, wherein the first encrypted data is a QR code, and the voucher verification auxiliary device reads the QR code by using a QR code reader therein.

16. The voucher verification auxiliary method of claim 13, wherein the voucher receiving terminal is a point-of-sale (POS) terminal or electronic access control equipment.

* * * * *